United States Patent [19]

Bergman

[11] 4,241,802
[45] Dec. 30, 1980

[54] METHOD AND CIRCUIT ARRANGEMENT FOR SWITCHING SIGNALS HAVING DIFFERENT TRANSMISSION SPEEDS WITHIN A PROGRAM-CONTROLLED DATA EXCHANGE SYSTEM

[75] Inventor: Ola Bergman, Starnberg-Landstetten, Fed. Rep. of Germany

[73] Assignee: Siemens Aktiengesellschaft, Berlin & Munich, Fed. Rep. of Germany

[21] Appl. No.: 22,701

[22] Filed: Mar. 22, 1979

[30] Foreign Application Priority Data

Mar. 31, 1978 [DE] Fed. Rep. of Germany ....... 2813961

[51] Int. Cl.³ .................. H04Q 9/00; H04L 5/00; H04L 11/00
[52] U.S. Cl. .................. 178/3; 340/147 LP
[58] Field of Search .......... 340/147 LP; 370/41, 370/91; 179/15 BV, 15 BA, 15 A; 178/3, 17.5, 2 R

[56] References Cited

U.S. PATENT DOCUMENTS 3,990,046  11/1976  Katz et al. ............ 340/147 LP

FOREIGN PATENT DOCUMENTS 2714888 of 0000 Fed. Rep. of Germany .
1529086 of 0000 United Kingdom .

OTHER PUBLICATIONS

"Siemens System EDS-System Description", Oct. 1977, pp. 4-9, 19-22 and 38-44.

Primary Examiner—Thomas A. Robinson
Attorney, Agent, or Firm—Hill, Van Santen, Steadman, Chiara & Simpson

[57] ABSTRACT

Signals of different transmission speeds are switched within a program-controlled data exchange system. The exchange system has connection circuits and/or connection circuit groups which are connected to either lines which supply the relevant signals and trunk lines which feed the signals forward. A switching arrangement which receives the signals supplied by the feeder lines to the connection circuits or connection circuit groups emits the signals to the desired truck lines by way of the connection circuits or connection circuit groups in question and carries out switching processes in response to switching requests from the connection circuits or connection circuit groups. Signals falling into one and the same transmission speed class are transmitted via one and the same connection circuit or connection circuit group, and the connection circuit or connection circuit group which serves to receive and-/or emit signals belonging to the highest transmission speed class is connected to the switching arrangement for the handling of switching requests having priority over the other connection circuits or connection circuit groups. After the connection circuit or connection circuit group for the highest transmission speed have handled switching requests, all the other connection circuits or connection circuit groups are connected, in alternation with one another, to the switching arrangement for the handling of their own switching requests.

9 Claims, 2 Drawing Figures

METHOD AND CIRCUIT ARRANGEMENT FOR SWITCHING SIGNALS HAVING DIFFERENT TRANSMISSION SPEEDS WITHIN A PROGRAM-CONTROLLED DATA EXCHANGE SYSTEM

BACKGROUND OF THE INVENTION

1. Field of the Invention

The present invention relates to a method and to a circuit arrangement for the switching of signals which fall into different transmission speed classes within a program-controlled data exchange having connection circuits and/or connection circuit groups to which are connected feed lines which supply the relevant signals and trunk lines which withdraw the relevant signals, and a switching arrangement which receives the signals supplied via the feed lines to the connection circuits or connection circuit groups, which emits the signals to the required trunk lines via the relevant connection circuits and connection circuit groups, and in which switching processes are executed in response to switching requests from the connection circuits or connection circuit groups.

2. Description of the Prior Art

A method and a circuit arrangement of the above-described type are known in the art; in this connection one may refer to the German Pat. No. 25 08 323. In this known process and circuit arrangement, the signals of the transmission speed classes are fed via the same connection circuits and connection circuit groups. However, it has proved that this technique results in the fact that only a relatively low overall switch-through efficiency can be expected in the switching arrangement, i.e. the number of signals which can be switched through in the switching arrangement per time unit without impermissibly high distortion is relatively low.

A method for increasing the switch-through efficiency of a time division multiplex (t.d.m.) switching system having asynchronous switch-through facilities has also already been proposed; in this connection one may refer to the German Application No. 27 14 888.5. In this method, in a synchronously operating data network, the items of communication are transmitted from input circuits to output circuits independently of a synchronizing pulse frame. The communications transmission is dependent upon the existence of channels having differing data transmission speeds which, however, are in a whole-numbered ratio to one another in accordance with CCITT recommendation X.1. In order to increase the switch-through efficiency of the t.d.m. switching system, it is provided that between the network pulse trains of the various speed stages there is carried out a phase shift having an angular degree which is determined by the number of connected speed stages and their relationship to one another. A disadvantage of this known process, however, resides in the fact that the switching arrangement cannot be operated with a standard network pulse train which normally ensures a simple operation of a switching arrangement. Moreover, it has proved that even when this process is employed, the switch-through efficiency achieved in the switching arrangement is not exceptional.

SUMMARY OF THE INVENTION

Consequently, the object of the present invention is to provide, in a particularly simple manner, for an increase in the switch-through efficiency in a switching arrangement by way of which signals falling in different transmission speed classes must be conducted.

The above object is achieved, according to the present invention, through a process of the type described in general terms above, in that the signals falling into one and the same transmission speed class are conducted via one and the same connection circuit or connection circuit group, and that the connection circuit or connection circuit group which serves to receive and/or emit signals of the highest transmission speed class is connected to the switching arrangement for the handling of switching requests having priority over the other connection circuits or connection circuit groups, and only after priority switching requests have been handled is it possible for all the other connection circuits or connection circuit groups to be alternately connected to the switching arrangement for the handling of the switching requests occurring therein.

A particular advantage of the present invention is that, in a particularly simple manner, practicing of the present invention allows a higher-switch-through efficiency to be achieved in the switching arrangement than the above-discussed processes.

For the execution of the process in accordance with the present invention, it is expedient to employ a circuit arrangement which is characterized in that feeder lines and/or trunk lines which conduct signals which fall into one and the same transmission speed class are connected to one and the same connection circuit or connection circuit group, and that the connection circuit or connection circuit group which serves to receive and/or emit signals of the highest transmission speed class are connected to the switching arrangement for the handling of switching requests having priority over the other connection circuits and connection circuit groups, whereas it is not until those priority requests have been handled that all the other connection circuits or connection circuit groups are alternately connected to the switching arrangement for the handling of the switching requests which occur therein. This results in the advantage of a particularly low circuit expense for the execution of the process according to the invention.

In accordance with an advantageous development of the invention, the individual signals are processed as polarity reversals. This advantageously results in a particularly simple switch-through of the signals to be processed within the switching arrangement.

In accordance with another expedient development of the invention, all the connection circuits or connection circuit groups are connected via a communications sequence controller to a memory unit which is controlled by a program control unit and in which the individual transmission lines are individually assigned storage cells for the reception and intermediate storage of the signals which are, in each case, to be switched. This results in the advantage of a particularly simple method of operating the individual connection circuits or connection circuit groups.

In accordance with a further advantageous feature of the invention, the communication sequence controller is provided with a priority terminal which is connected to that connection circuit or connection circuit group by way of which signals of the highest transmission speed class are transmitted; this priority terminal is consecutively connected to the switching arrangement at a frequency corresponding to the transmission speed of the highest transmission speed class in each case until all the signals falling into the highest transmission speed class have been switched through. The communication sequence controller is also connected by a number of normal terminals to the other connection circuits or connection circuit groups. These normal terminals are alternately employed following the switch-through of the signals to be conducted across the priority terminal. This results in the advantage of a method of operating the individual connection circuits or connection circuit groups by the communication sequence controller which is particularly simple in terms of circuitry.

In accordance with another expedient development of the invention, the transfer and the processing of the switching requests from the connection circuits and connection circuit groups connected to the normal terminals of the communication sequence controller is carried out within the timing of polarity reversals in the signals which are to be switched. This results in the advantage of a particularly simple method of operating the connection circuits and connection circuit groups connected to the normal terminals of the communication sequence controller.

In accordance with another expedient development of the invention, the individual terminals of the communication sequence controller are only included in the execution of switching processes in the event that they have signals to transmit. This results in the advantage that connection circuits and connection circuit groups are operated only when signals are to be transmitted by way of the same, and thus switching requests are present.

BRIEF DESCRIPTION OF THE DRAWINGS

Other objects, features and advantages of the invention, its organization, construction and operation will be best understood from the following detailed description, taken in conjunction with the accompanying drawings, on which.

DESCRIPTION OF THE PREFERRED EMBODIMENTS

Description of the Apparatus

Figure 1:
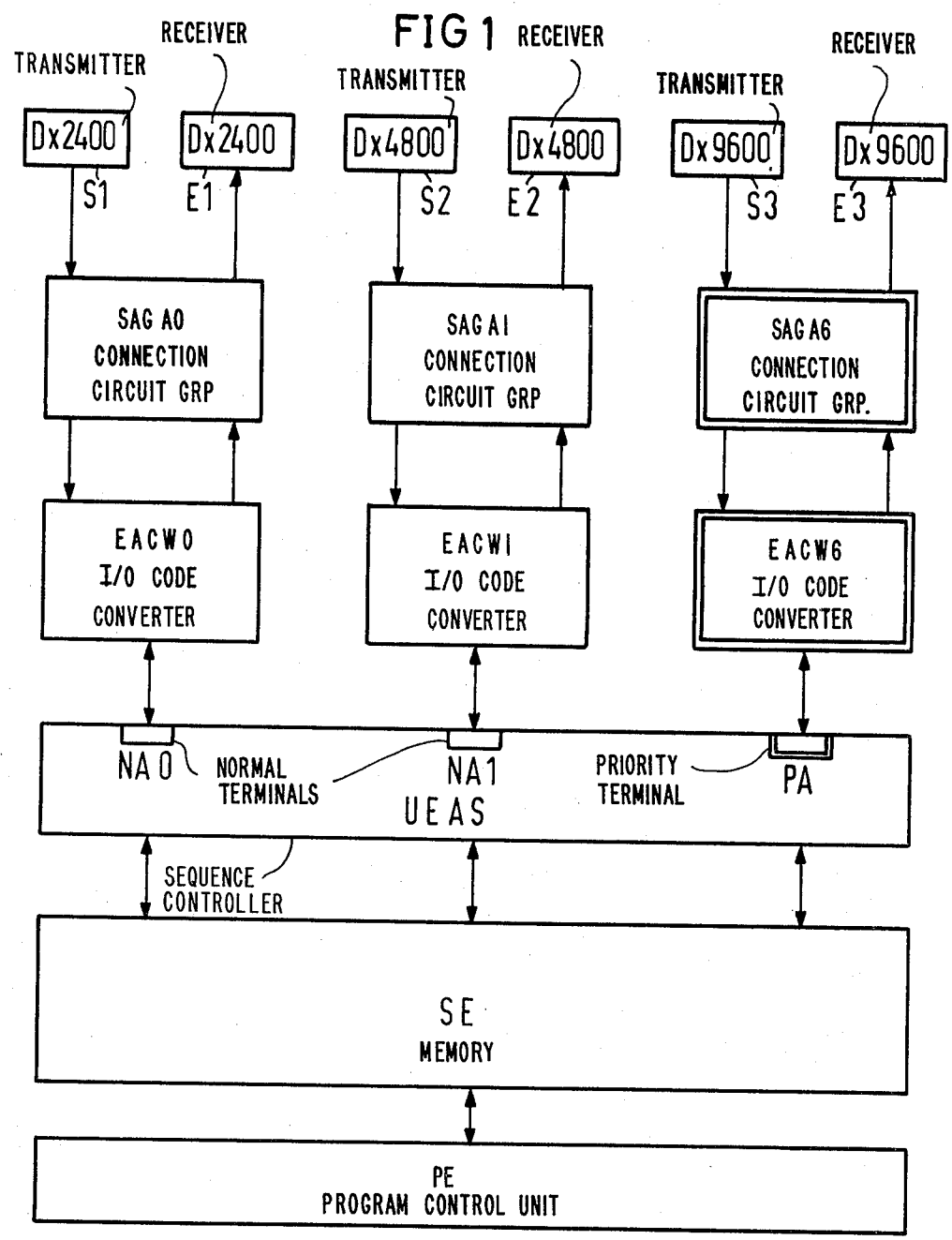
FIG. 1 is a schematic representation of a circuit arrangement constructed in accordance with the present invention.

Referring to FIG. 1, a program-controlled data exchange system is illustrated, the fundamental structure of which is already known as a EDS system ("Der Fernmelde-Ingenieur", Vol. 5, May 1972). This data exchange system is also described in the publication "SIEMENS SYSTEM EDS" issued in English by Bereich Fernschreib- und Datenverkehr, Munich, October 1977, fully incorporated herein by this reference, and fundamentally comprises a memory unit SE which cooperates with the program control unit PE and which is capable of receiving and/or emitting signals via a communication sequence controller UEAS. In the present case, these signals will be assumed to consist of polarity reversals. Polarity reversals of this kind are supplied to the program-controlled data exchange system illustrated in FIG. 1 from a series of signal transmitters, of which only three signal transmitters S1, S2 and S3 have been illustrated on the drawing. The relevant signals are emitted from the data exchange system to signal receivers, of which three signal receivers E1, E2 and E3 have been illustrated on the drawing.

The aforementioned signal transmitters and signal receivers are each designed to emit and receive signals which fall into different transmission speed classes. Therefore, the signal transmitter S1 and the signal receiver E1 are designed to transmit and receive signals which, for example, occur with 2400 bit/s. In contrast, the signal transmitter S2 and the signal receiver E2 are designed to transmit and receive signals which occur at 4800 bit/s. Finally, the signal transmitter S2 and the signal receiver E3 are designed to transmit and receive signals which occur at 9600 bit/s. The aforementioned signal transmitters and signal receivers can, for example, form part of a known communications system which is capable of transmitting data signals at the above-mentioned transmission rates in the form of synchronous datex services. One such datex service is indicated by the reference D×2400 in the signal transmitter S1 and in the signal receiver E1; a further datex service is indicated by the reference D×4800 in the signal transmitter S2 and in the signal receiver E2; and finally, a further datex service is indicated by the reference D×9600 in the signal transmitter S3 and in the signal receiver E3.

The above-considered signal transmitters and signal receivers are connected to the switching arrangement illustrated in FIG. 1 by way of system connection circuits (terminator circuits) or system connection circuit groups (terminator groups) and following input/output code converters. Signal transmitters and signal receivers which transmit and receive signals falling into one and the same transmission speed class receive signals falling into one and the same transmission speed class, and consequently also the feed lines and the trunk lines which carry such signals, are connected to one and the same connection circuit or connection circuit group. Therefore, the signal transmitter S1 is connected by its feed line and the signal receiver E1 by its trunk line to the system connection circuit or connection circuit group SAG A0. The signal transmitter S2 is connected by its feed line and the signal receiver E2 by its trunk line to the connection circuit or connection circuit group SAG A1. Finally, the signal transmitter S3 is connected by its feed line and the signal receiver E3 by its trunk line to the system connection circuit or system connection circuit group SAG A6.

The system connection circuit or system connection circuit group SAG A0 is connected by way of an input/output code converter EACW 0 to a normal terminal NA 0 of the communication sequence controller UEAS. The system connection circuit or system connection circuit group SAG A1 is connected by way of an input/output code converter EACW 1 to a further normal terminal NA 1 of the communication sequence controller UEAS. The system connection circuit or system connection circuit group SAG A6 is connected via an input/output code converter EACW 6 to a priority terminal PA of the communication sequence controller UEAS.

Before turning to a detailed discussion of the mode of operation of the circuit arrangement illustrated in FIG. 1, it should first be noted that the above-considered system connection circuits and system connection circuit groups can be provided in larger number than indicated on the drawing. Moreover, a plurality of signal transmitters and signal receivers are connected to a system connection circuit group.

Mode of Operation

In order to explain the mode of operation of the circuit arrangement illustrated in FIG. 1, it will be assumed that the switching arrangement which comprises the memory unit SE, the program control unit PE and the communication sequence controller UEAS fundamentally operates as already explained above. Accordingly, the signals supplied for switching purposes to the switching arrangement are processed as polarity reversals. This is carried out in that the signals or polarity reversals which are fed via the feed lines to the system connection circuits or system connection circuit groups cause switching requests to be emitted to the switching arrangement which then handles the switching requests by switching through the individual signals or polarity reversals. This switching procedure is fundamentally effected in that, on the occurrence of the relevant switching request, a feeder cell assigned to the feeder line which triggers the switching requests is actuated in the memory unit SE, and contains the address of the trunk line which serves to forward the polarity reversal which has caused the aforementioned switching requests.

Beyond this general mode of operation of the switching arrangement the present invention provides that the connection circuit or connection circuit group which serves to receive and/or emit signals belonging to the highest transmission speed class, i.e. the system connection circuit or system connection circuit group SAG A6, is connected to the switching arrangement for the handling of switching requests having priority over the other system connection circuits and system connection circuit groups. It is not until the handling of switching requests in the connection circuit or connection circuit group SAG A6 by way of which the signals of the highest transmission speed class are transmitted that the other system connection circuits or system connection circuit groups are alternately connected to the switching arrangement for the handling of their own switching requests. For this purpose, the system connection circuit or system connection circuit group SAG A6 is connected via its input/output code converter EACW6 to the aforementioned priority terminals PA of the communication sequence controller UEAS, whereas the other system connection circuits or system connection circuit groups SAG A0 and SAG A1 are connected by their associated input/output code converters EACW0 and EACW1 only to normal terminals NA0 and NA1 of the communication sequence controller UEAS, i.e. to terminals which are not used for signal reception and signal transmission until the priority terminal PA has been operated.

The aforementioned priority terminal PA of the communication sequence controller UEAS here is connected in a cyclic sequence to the switching arrangement at a frequency corresponding to the transmission speed of the highest transmission speed class. The connection state continues until the switch-through of all of the signals which fall into the highest transmission speed class and which are to be fed by way of the system connection circuit or system connection circuit group SAG A6. Only after having switched through all of the signals falling into the highest transmission speed class, and therefore after having handled the buffered switching request which have occurred in respect of this transmission speed class, the buffered signals which fall into the other transmission speed classes are switched through and consequently the corresponding switching requests are handled alternately. These conditions are illustrated on the diagram of FIG. 2.

Figure 2:
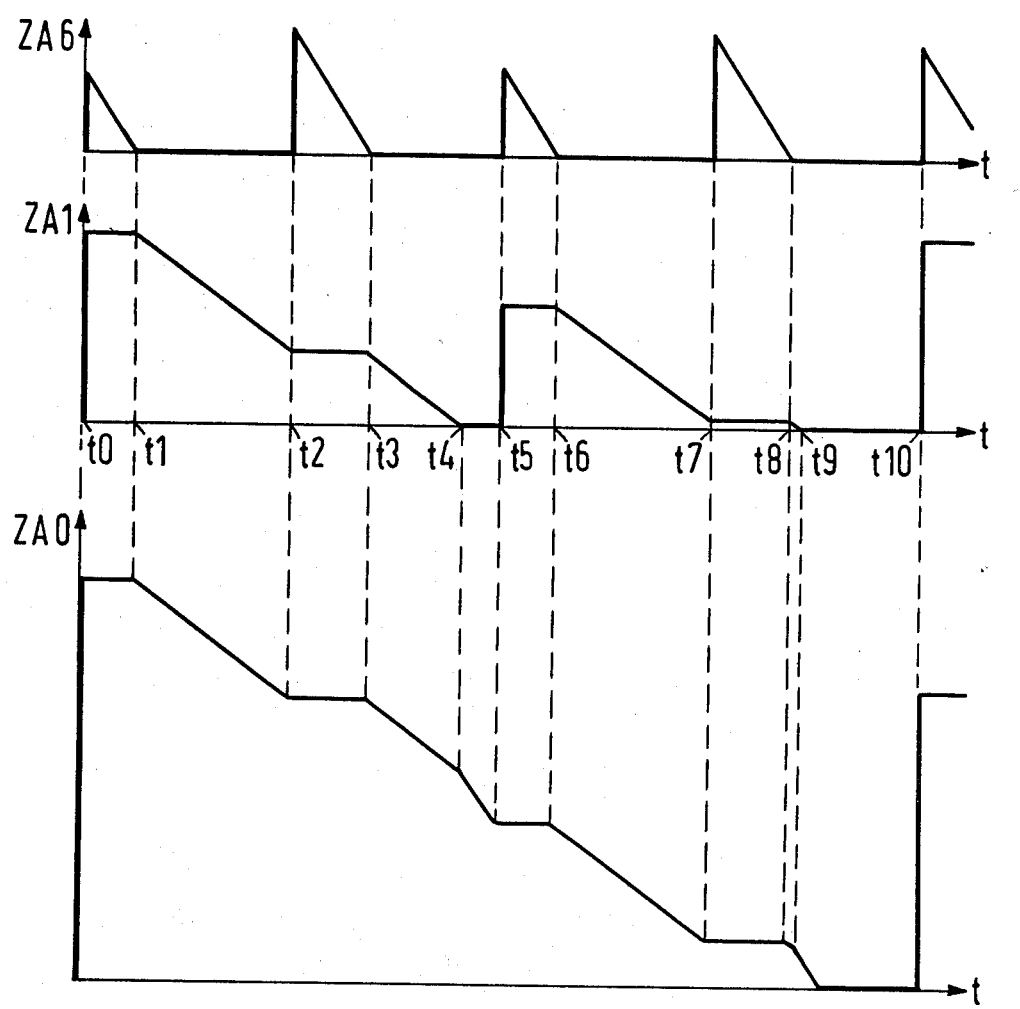
FIG. 2 illustrates, in the form of a timing diagram, a synchronous mode of operation of the circuit arrangement illustrated in FIG. 1.

FIG. 2 is divided into three subsidiary diagrams illustrating the loading of the switching arrangement by signals which fall into different transmission speed classes and which are switched through with alternating polarity. The upper subsidiary diagram of FIG. 2 illustrates the loading of the switching arrangement which is indicated by ZA6 and which results from the transission of signals via the system connection circuit or system connection circuit group SAG A6 by way of which signals belonging to the highest transmission speed class (9600 bit/s) are to be conducted. As can be seen, the signals occurring in this transmission speed class and, therefore, the corresponding switching requests, are handled in a cyclic sequence, in each case in full, following preliminary buffering.

The central subsidiary diagram of FIG. 2 illustrates the loading of the switching arrangement, indicated by ZA1, by signals which are to be conducted across the system connection circuit or system connection circuit group SAG A1. Finally, the lower subsidiary diagram of FIG. 2 illustrates the loading of the switching arrangement which is indicated by ZA0 and which occurs when signals are to be conducted across the system connection circuit or system connection circuit group SAG A0.

If the central subsidiary diagram and the lower subsidiary diagram are considered in comparison with the upper subsidiary diagram of FIG. 2, it can be seen that during the interval of time t0 to t1 only signals which fall into the highest transmission speed class are processed, which means that the load ZA6 is handled in full. During this interval of time, the loads ZA1 and ZA0 remain unchanged, as illustrated by corresponding horizontal lines. When all the signals which fall into the highest transmission speed class have been switched through, the signals falling into the other speed classes are switched through and corresponding switching requests are handled. This is carried out during the interval of time t1 to t2. In accordance with the invention, the signals to be conducted across the system connection circuits or system connection circuit groups SAG A1 and SAG A0 are switched through alternately to one another and, in fact, in particular as polarity reversals. Consequently, in the central and lower subsidiary diagrams of FIG. 2, the curve sections within the interval t1 to t2 exhibit the same inclination.

At the time t2 the switching of signals belonging to the "lower" transmission speed classes comes to a halt, however, as at this time signals belonging to the highest transmission speed class are again present in buffered form, so that it is necessary to switch through these signals. This switching is carried out within the interval of time from t2 to t3. During the following interval of time t3 to t4, the still-buffered signals falling into the "lower" transmission speed classes are switched through. At the time t4 the switching of signals to be conducted across the system connection circuit or system connection circuit group SAG A1 is concluded. During the following interval of time t4 to t5, only the signals belonging to the lowest transmission speed class are switched through, as indicated by a steeper inclination of the corresponding curve section in the lower curve diagram of FIG. 2.

At the time t5 signals belonging to the highest transmission speed class (ZA6) and the second highest transmission speed class (ZA1) are again present in buffered form, so that corresponding switching requests exist. First, however, during the interval of time t5 to t6, only the signals of the highest transmission speed class are switched through. During this interval of time, the signals belonging to the "lower" transmission speed classes are not switched through, as indicated by the corresponding horizontal line in FIG. 2. Then, during the interval of time t6 to t7 the signals belonging to the "lower" transmission speed classes are again switched through in alternation with one another. This switching process comes to an end, however, during the interval of time t7 to t8, as during this interval of time signals belonging to the highest transmission speed class are again present in buffered form and provide priority switching requests so that the same are switched through. In the subsequent interval of time t8 to t9, the signals of the "lower" transmission speed classes are again switched through in alternation with one another.

From the time t9 onward, only signals belonging to the lowest transmission speed class must be switched through. However, the number of these signals is so low that all the switching processes have been concluded before the time t10. At this time t10 the processes which have been explained in association with the time t0 begin anew.

With regard to the diagram of FIG. 2, it should finally be noted that the load values indicated in the individual subsidiary diagrams conform to a random distribution. Moreover, FIG. 2 illustrates that the individual terminals of the communication sequence controller UEAS of FIG. 1 are only included into the execution of switching processes, i.e. into the handling of signals of polarity reversals, in the event that they have signals or polarity reversals to transmit. Generally, it is necessary to meet the requirement that, in each transmission speed class, all the switching requests must be handled before further switching requests occur within the relevant transmission speed class.

Although I have described my invention by reference to particular illustrative embodiments thereof, many changes and modifications of the invention may become apparent to those skilled in the art without departing from the spirit and scope of the invention. We therefore intend to include within the patent warranted hereon all such changes and modifications as may reasonably and properly be included within the scope of our contribution to the art.

I claim:

1. A method for switching signals which fall into different transmission speed class within a program-controlled data exchange system which has inputs and outputs assigned to respective speed classes, and a switching arrangement, comprising the steps of:
   receiving the signals in respective transmission speed classes at respective inputs;
   generating switching requests for each transmission class upon receipt of signals in the respective transmission class;
   first, switching through to a respective output those signals which cause switching requests for the highest transmission speed class as a priority over the other transmission speed classes; and
   then, only after completion of transmission at the highest transmission speed, switching through the signals of the other speed classes alternately from respective inputs to respective outputs.

2. A circuit arrangement for switching signals of different transmission speed classes through a data exchange system, comprising:
   a plurality of input/output circuits for receiving and transmitting signals of respective transmission speed classes;
   input/output means connected to said input/output circuits and responsive to received signals to produce respective switch-through requests; and
   a switching arrangement connected to said input/output means and operable to cause said input/output means to switch through the highest transmission speed one of said input/output circuits in response to the respective switch-through request as a priority transmission and then sequentially switch through the remaining input/output circuits in response to their respective switch-through requests.

3. The circuit arrangement of claim 2, wherein said input/output circuits comprise:
   line terminator circuits and respective incoming lines and outgoing trunks connected thereto.

4. The circuit arrangement of claim 2, wherein said input/output circuits comprise:
   line terminator circuit groups and respective incoming lines and outgoing trunks connected thereto.

5. The circuit arrangement of claim 2, wherein said input/output circuits comprise:
   line terminator circuit means and respective incoming lines and outgoing trunks connected thereto.

6. The circuit arrangement of claim 5, wherein said line terminator circuit means comprises
   means for processing the incoming signals as polarity reversals.

7. The circuit arrangement of claim 5, wherein said switching arrangement comprises:
   a communication sequence controller including a priority terminal connected to receive priority switch-through requests originating from the highest transmission speed input/output circuit and a plurality of other terminals respectively connected to receive switch-through requests originating from the remaining input/output circuits and operable at the transmission speed of the highest transmission speed class to cause priority switch-through and then operable at the respective transmission speeds to cause successive non-priority switch-through for the other transmission speed classes.

8. A circuit arrangement for switching signals of different transmission speed classes through a data exchange system, comprising:
   a plurality of input/output circuits for receiving and transmitting signals of respective transmission speed classes;
   said input/output circuits comprising respective line terminator circuits and respective incoming lines and outgoing trunks connected thereto;
   input/output means connected to respective ones of said input/output circuits and responsive to received signals to produce respective switch-through requests; and
   a switching arrangement connected to said input/output means and operable to cause said input/output means to switch through the input/output circuit assigned to the highest transmission speed class in response to the respective switch-through request and then sequentially switch through the remaining input/output circuits in response to their respective switch-through requests;

said switching arrangement comprising a communication sequence controller including a priority terminal connected to receive priority switch-through requests originating from said input/output circuit assigned to the highest transmission speed class and a plurality of other terminals respectively connected to receive switch-through requests originating from the remaining input/output circuits and operable at the transmission speed of the highest transmission speed class to cause priority switch-through and then operable at the respective transmission speeds to cause successive non-priority switch-through for the other transmission speed classes.

9. A circuit arrangement for switching signals of different transmission speed classes through a data exchange system, comprising:

a plurality of line terminator circuits and respective incoming lines and outgoing trunks connected thereto for receiving and transmitting signals of respective transmission speed classes;

input/output means connected to said terminator circuits and responsive to received signals to produce respective switch-through requests; and a switching arrangement connected to said input/output means and operable to cause said input/output means to switch through the terminator circuit assigned to the highest transmission speed class in response to the respective switch-through request and then sequentially switch through the remaining terminator circuits in response to their respective switch-through requests;

said switching arrangement comprising a communication sequence controller including a priority terminal connected to receive priority switch-through requests originating from said terminator circuit assigned to the highest transmission speed class and a plurality of other terminals respective connected to receive switch-through requests originating from the remaining terminator circuits and operable at the transmission speed of the highest transmission speed class to cause priority switch-through and then operable at the respective transmission speeds to cause successive non-priority switch-through for the other transmission speed classes.

* * * * *